United States Patent [19]

Nora et al.

[11] Patent Number: 5,723,160
[45] Date of Patent: Mar. 3, 1998

[54] PLANT FOR THE TREATMENT OF POWDERS, OR GRANULES, IN PARTICULAR OF THE FOOD, CHEMICAL, OR PHARMACEUTICAL INDUSTRIES

[75] Inventors: Andrea Nora; Ruggero Barani, both of Modena, Italy

[73] Assignee: ICO Oleodinamici S.p.A., Italy

[21] Appl. No.: 535,031
[22] PCT Filed: Apr. 19, 1994
[86] PCT No.: PCT/EP94/01219
  § 371 Date: Oct. 17, 1995
  § 102(e) Date: Oct. 17, 1995
[87] PCT Pub. No.: WO94/23831
  PCT Pub. Date: Oct. 27, 1994

[30] Foreign Application Priority Data

Apr. 20, 1993 [IT] Italy ................... MO93A0055
Apr. 20, 1993 [IT] Italy ................... MO93A0056

[51] Int. Cl.⁶ .................... B01J 2/16; B29B 9/08
[52] U.S. Cl. ............... 425/472; 425/222; 23/313 FB; 264/117; 422/139; 422/140
[58] Field of Search ................... 264/401, 117; 425/222, 472; 23/313 FB; 422/139, 140

[56] References Cited

U.S. PATENT DOCUMENTS

| | | | |
|---|---|---|---|
| 4,027,624 | 6/1977 | Motoyama | 118/303 |
| 4,797,271 | 1/1989 | Fleming et al. | 23/313 FB |
| 4,832,700 | 5/1989 | Kaspar et al. | 23/313 FB |

*Primary Examiner*—Mary Lynn Theisen
*Attorney, Agent, or Firm*—Fenwick & West LLP

[57] ABSTRACT

The plant for treating powders or granules enables a considerable simplification of the operation of cleaning the filters, and a more efficient centering of the basket container, and includes a tubular casing coupled in a detachable manner to a cover and a base structure. The tubular casing may be rotatable around a horizontal axis on opposing aligned appendages, and the base structure may include a basket resting on a trolley which can be lifted in a guided manner to couple with the bottom edge of the casing. The plant may be used in a wide variety of industrial applications, in particular in the chemical, food and pharmaceutical industries.

19 Claims, 19 Drawing Sheets

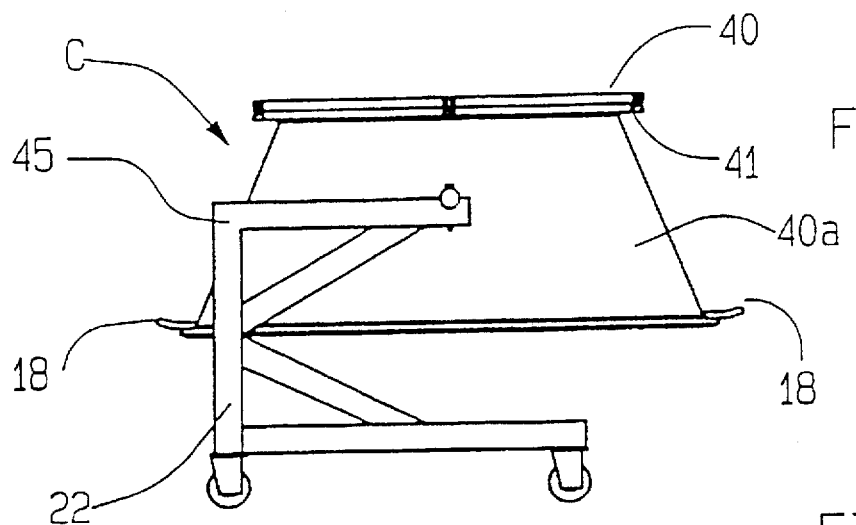
FIG. 16
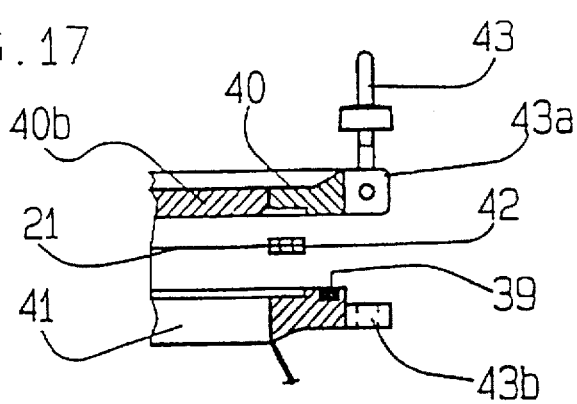
FIG. 17
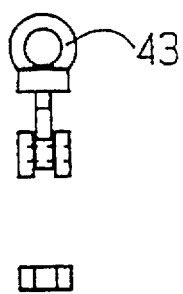
FIG. 18
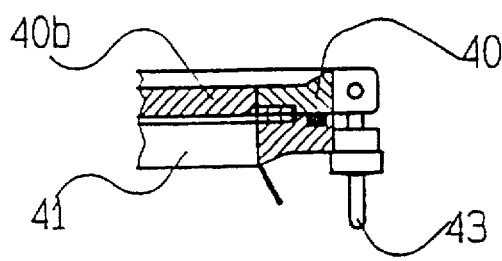
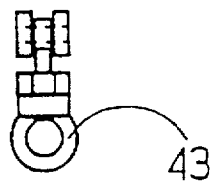
FIG. 19
FIG. 20
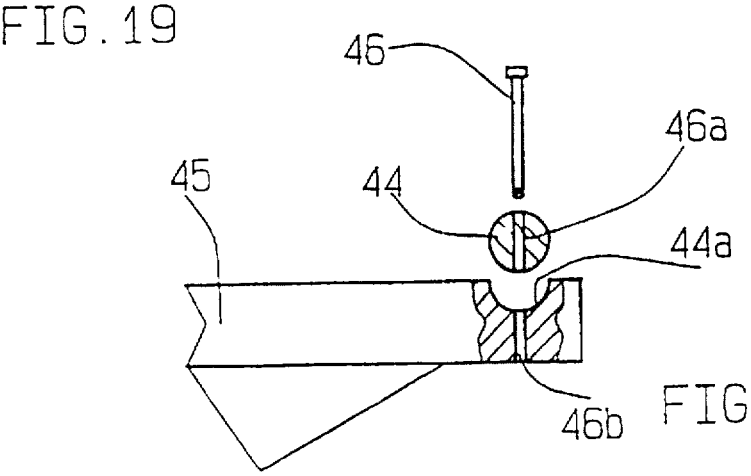
FIG. 21

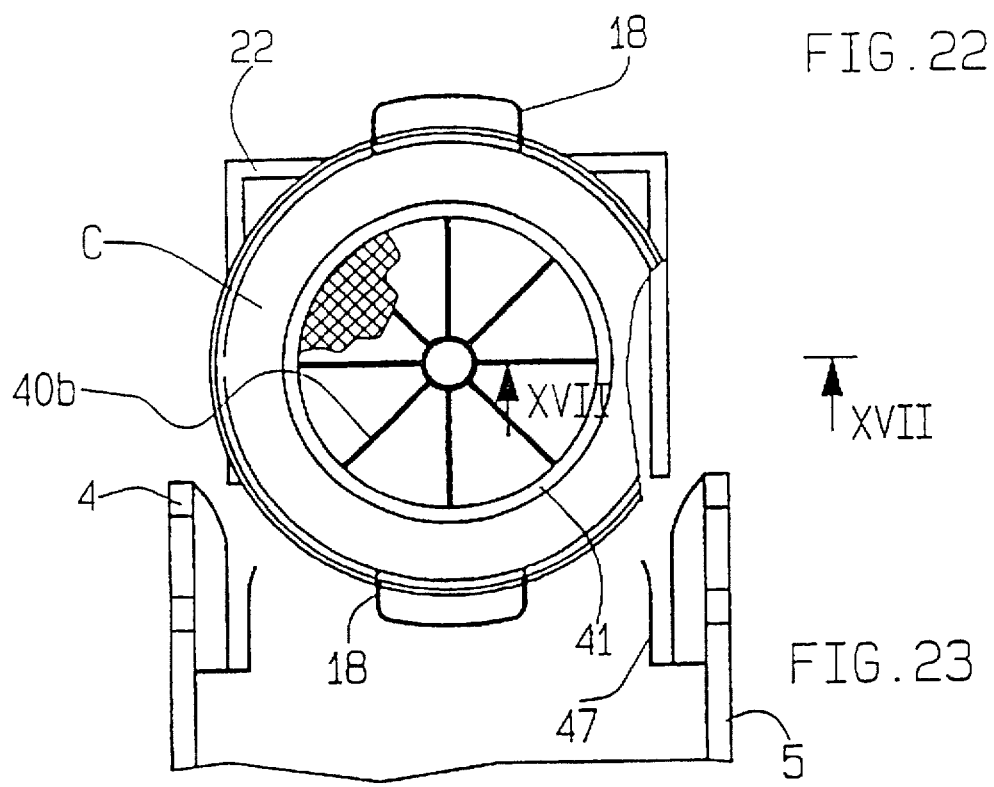
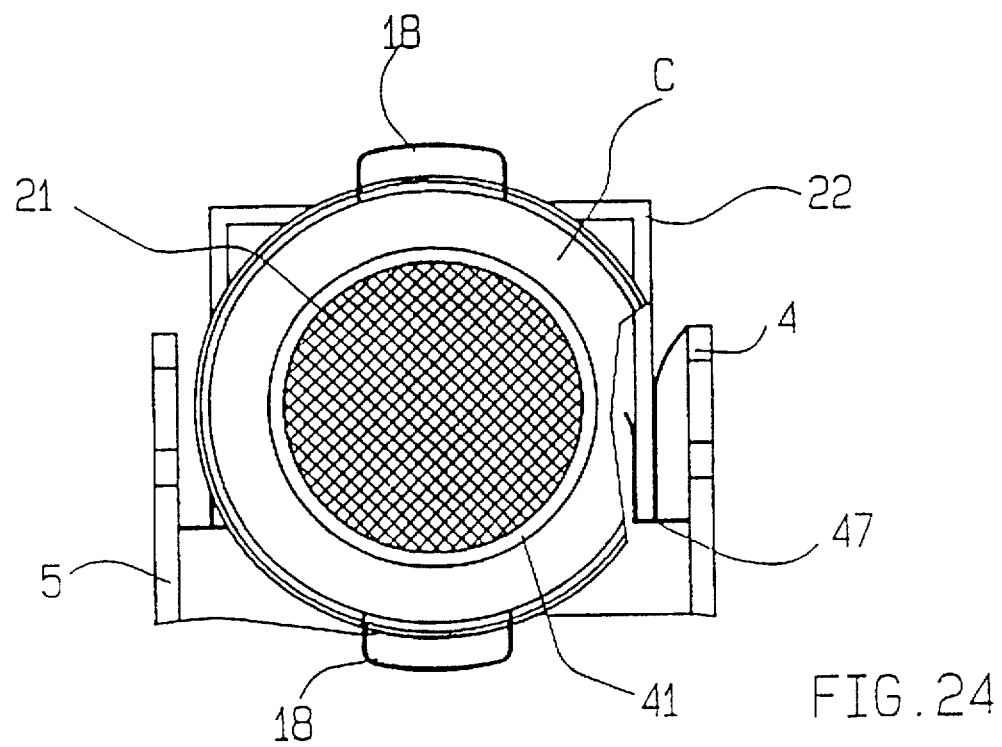

PLANT FOR THE TREATMENT OF POWDERS, OR GRANULES, IN PARTICULAR OF THE FOOD, CHEMICAL, OR PHARMACEUTICAL INDUSTRIES

BACKGROUND OF THE INVENTION

Field of the Invention

This invention relates to processing plants for powders and granules, and more particularly to such plants includes containers for powders or granules with associated filters that can be readily replaced or serviced in convenient manner.

The state of the art comprises silos, generally cylindrical in shape, for the storage of powdery or granular materials, such as, for example, cement, flour, cereals or other substances, that have, on their top side, filter units through which, during the filling phase, a current of pressurized air containing the material that is to be placed in the silo is made to pass, using the known techniques of pneumatic transportation of loose products.

The state of the art also comprises plant for the agglomeration of powdered materials consisting of an agglomeration chamber, the sides of which are made up of a cylindrical casing, with, at its lower end, a detachable basket, fixed with a sealing coupling, that contains the material to be agglomerated; a dispenser for atomized binding liquid is positioned inside the agglomeration chamber, to spray the product for a predetermined interval of time, depending on the dimensions of the granules required and on the type of product: the product is sprayed when a stream of heated air is forced upwards through the perforated basket, causing it to be blown around inside the chamber; the air is then made to pass through filter units positioned at the top end of the agglomeration chamber for its subsequent expulsion into the atmosphere.

With both the ensilation plants and the powder or granule agglomeration plants, however, the substitution and cleaning of the filter units is a somewhat awkward and onerous operation.

In fact, the task involves the operator, after having lifted the closing cover, or cap, accessing a support plate for the filters from above in order to remove them, lowering them and subsequently cleaning them; alternatively, when the said support plate is fixed to the casing itself, and it being possible to remove the filters from below the support plate, the operator, whilst being facilitated in the removal of the filters, is unable to avoid the precipitation of the residue filtered out by the filters; this signifying that the operator is inevitably contaminated with the product, which can sometimes represent a health hazard, especially in the case of powders used in the preparation of chemical or pharmaceutical substances.

Furthermore, in the case of the agglomeration plants, the centering of the basket in relation to the bottom edge of the agglomeration chamber is extremely precarious, consequently requiring expensive and encumbering auxiliary centering mechanisms in order to prevent the powder from escaping.

The state of the art also involves agglomeration methods in which a heated stream of air is passed upwards through the powder, causing it a substantially vertical fluctuating motion, or fluidizing it, inside an agglomeration chamber; above the fluctuating mass, or liquid bed, a binding liquid is atomized which agglomerates the particles of powder by hydrating the granules by their coalescing with nuclei of larger dimensions, formed at random inside the fluctuating mass; the supply of the atomizing liquid being interrupted after e set time, proportional to the dimensions of the agglomerated particles required.

The flow of heated air is generally only interrupted after another set interval of time has passed sufficient to dry out the agglomerated particles: in this way unwanted sticking together of damp particles that would give rise to uncontrolled variations in the dimensions of the resulting product is avoided. At the end of the drying phase, the product is extracted from the agglomeration chamber and the cycle is repeated with the successive load of powder; alternatively, if the size of the granules needs to be increased beyond that which is obtainable in a single agglomeration cycle, the granules are once again blasted by the stream of heated air and sprayed with the atomized binding liquid until the desired dimensions are achieved whereupon they are dried and extracted.

Moreover, in the traditional procedures, the various phases are regulated by means of manual intervention on the controlling mechanisms for the liquid and air flows, particularly in the variation of the corresponding flow sections; this results in a high degree of imprecision of control, considerable losses, high possibility of errors, especially with complex cycles, in which, in other words, there are a considerable number of phases of not necessarily constant duration, low degrees of repeatability with, consequently, undesirable variations in the quality of the product.

Furthermore, the interruption of the flow of binding liquid, an operation of the utmost importance that prevents the supply of a damaging excess of liquid that would cause an undesired increase in the size of the granules, if not even the formation of a compact cake, and consequently a high incidence of rejects, can only be achieved, with the required reliability, with the closure of the flow section of the atomizer nozzle by means of a costly and complex pin shutter: this involves a considerable increase in costs and high risk of jamming.

The fluidized powders, moreover, especially with reduced loads with respect to the capacity of the agglomeration chamber, encroach the area taken up by the filter units, causing them to become rapidly clogged, consequently requiring more frequent cleaning, involving in each case the interruption of the cycle.

Finally, operation of the plant requires the more or less constant attendance of an operator who, as well as being specialized, is extremely sensitive to corrective interventions, even improvised, to the procedural parameters, particularly during the setting up phases for the agglomeration of new products.

Such prior art may be subject to considerable improvements with a view to eliminating the said drawbacks.

From the foregoing emerges the need to resolve the technical problem of inventing a container for powders or granules, to be inserted in a plant for the agglomeration of powders, in which it is possible to substitute the filter, units without the operator having to perform dangerous operations at elevation, avoiding also contamination with the product in question; furthermore, inventing a container to be inserted in a plant for the agglomeration of powders in which it is possible to centre the basket at the base of the casing of the agglomeration chamber automatically, or, in any case, without requiring laborious operations; this in a safe manner and with contained costs.

From the foregoing also emerges the need to resolve the technical problem of inventing a method for the agglomeration of a powdery mass, and/or for the further agglomeration of a granular mass, that enables a high degree of precision in the control of the flow of air to lift and cause the fluctuation of the mass and of the flow of binding liquid, enabling also a high degree of repeatability, with considerable reduction in losses, particularly in complex cycles, that is, consisting of a considerable number heating, agglomeration and drying phases, however coordinated with one another and having durations that are not necessarily constant; this in order to improve the quality of the product.

Such a method also enabling, with contained costs, a considerable reduction in the risk of the binding liquid dripping, that is of residual outflow of liquid from the dispensing nozzle.

SUMMARY OF THE INVENTION

The invention resolves the said technical problem by adopting a plant for the treatment of powders including a container that is prevalently vertical in extension, having an intermediate tubular portion, coupled to a base structure functioning as underside and to a cover having filter units for the transportation, or processing, of air; the casing of the intermediate portion of the container being supported in such a way so that it may rotate on a horizontal axis, so that it is possible, in the configuration whereby it is disconnected from the base and the cover, to rotate it through an angle of approximately 180° around the said axis, so as to overturn the said intermediate portion to a point where the end section that couples with the cover is positioned at a height that enables access for an operator on the ground or possibly on a platform.

The base structure, or basket, being preferably in the form of a truncated cone diverging upwards, being such that it may be coupled to a mobile support trolley by means of at least one pair of hinges, advantageously aligned, resting on opposing arms of the said trolley in such a way that the base structure may be angled at will with respect to a horizontal plane.

The method for the agglomeration of powders or granules as described including a first phase consisting of the formation of a liquid bed fluctuating in a prevalently vertical direction in a stream of air of a controlled temperature, a second phase in which the mass is agglomerated with the application of a atomized binding liquid on the particles constituting the said mass, a third phase in which the granules are dried; the number of successive repetitions of the said first and/or second and/or third phases and their corresponding durations being coordinated together by means of an iterating computer program organized as follows:

setting of a parameter proportional to the duration of the first phase;

setting of a parameter proportional to the duration of the second phase;

setting of a parameter proportional to the duration of the third phase;

setting of the number of iterations.

At the end of the agglomeration phase the interruption of the flow of binding liquid being advantageously achieved, without dripping, with the inversion of the direction of flow of the liquid in a portion of the supply tube from the corresponding supply pump and the outlet section of the atomized liquid dispenser.

Alternatively, the interruption of the flow of binding liquid can be achieved with the redirection of the said fluid to the tank, with possibly the simultaneous closing of the outlet section of the atomized liquid. Said closure can be achieved with the activation of a one-way flow interceptor valve.

The method can also be associated with a control of the value of the pressure in the agglomeration chamber achieved with the generation of an electrical signal proportional to the pressure in the agglomeration chamber which is sent to an electronic processor, which, on confrontation with a predetermined limit value, emits an electrical signal that pilots the angular velocity of the air circulation fan.

According to a further embodiment of the method disclosed by the present invention, the process of agglomeration of the powders is controlled in function of the differences in temperature of the air at the inlet of the granulator and at its outlet.

More specifically, the air temperature at the inlet of the granulator is set (the set point temperature) a critical temperature is set at the outlet of the granulator, depending on the product to be granulated (obtainable by experiment), and a value of the outlet air temperature corresponding to the beginning of the atomization of the binding liquid (pump start temperature) is set, the supply of the binding liquid is started when the outlet temperatures reaches the pump start temperature.

Some of the advantages offered by the present invention are: the possibility of substituting the filter units from the ground by overturning the intermediate portion of the silo, or container in general, avoiding dangerous operations at height of the operator, avoiding also contamination from the product being processed; improved centering of the basket on the lower edge of the agglomeration chamber; improved safety and lower costs; operation of the plant with the presence of a highly specialized technician having also high degree of sensibility for the corrective and distributive parameters; high degree of precision in the variation of the air flow for the formation of the fluid bed and of the flow of binding liquid, with highest levels of repeatability, even for complex cycles, that is, consisting of a considerable number of heating, agglomeration and drying phases, however coordinated with one another and having durations that are not necessarily constant; increase in the quality of the product; considerable reduction in the risk of the binding liquid dripping with, consequently, the elimination or drastic reduction in the quantity of rejects; contained costs; possibility of application in any vertical fluid bed agglomeration plant.

BRIEF DESCRIPTION OF THE DRAWING

Some embodiments of the invention are illustrated, by way of example and with non-limiting reference to a powder agglomeration plant, in the 19 sheets of drawings attached, in which: FIG. 16 is the side view of the basket rotated 180° for dismounting the fluidizing net; FIG. 17 is section XVII—XVII of FIG. 22 with the components separated, concerning the rapidlocking device of the said net with air seal; FIG. 18 is the reflected view of FIG. 17 showing the connection between the flanges making up the said locking device; FIGS. 19, 20 show the locked position of FIGS. 17, 18; FIG. 21 is an enlarged and partially sectioned detail of the support hinge of the trolley, floating in the vertical direction; FIGS. 22, 23, 24 are top views, respectively, of the basket on the trolley, of its guide rails in the structure and of the two together; FIG. 31 is a view as in FIG. 21, but in the version with the basket as in FIG. 27.

DESCRIPTION OF THE PREFERRED EMBODIMENT

Figure 1:
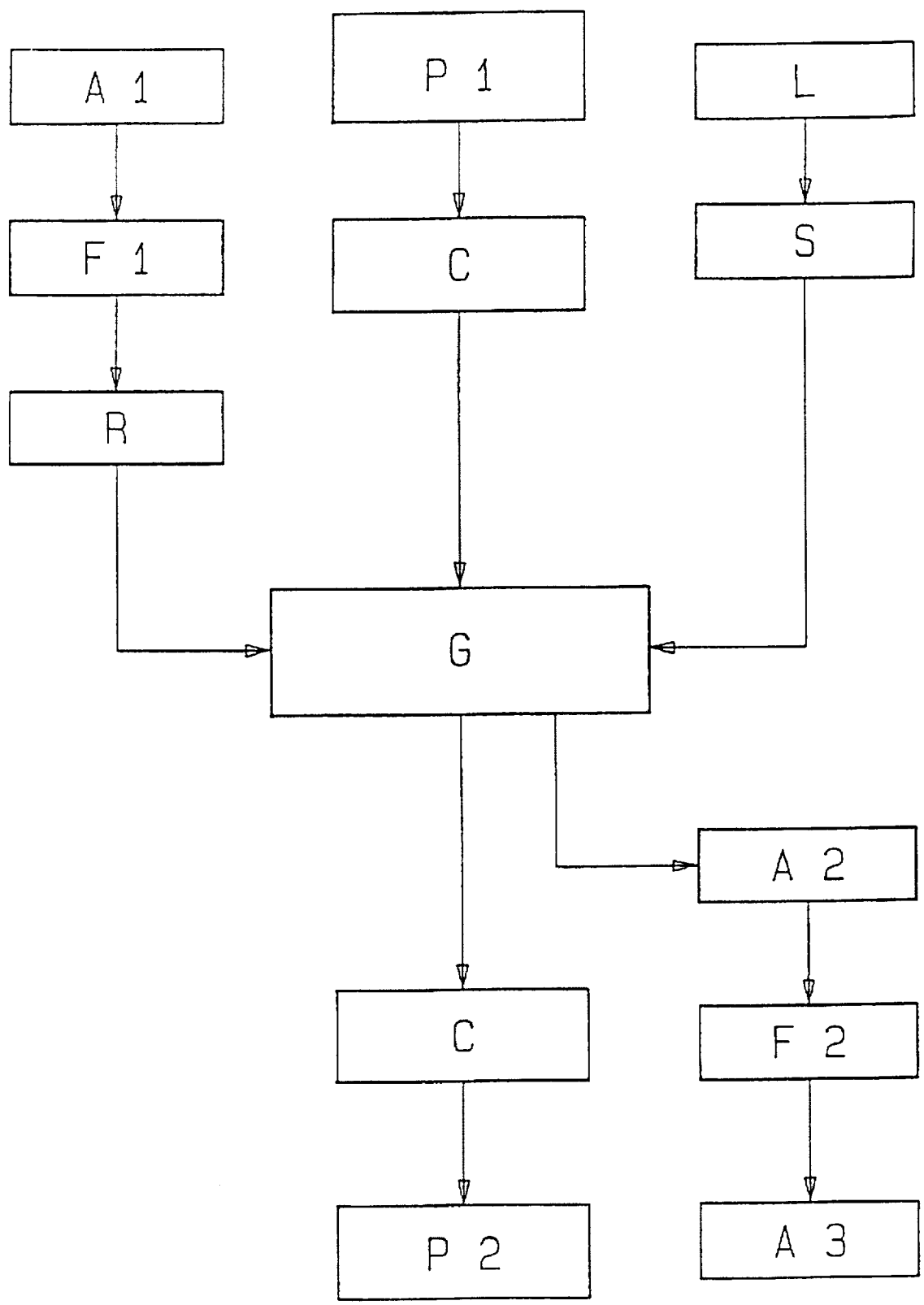
FIG. 1 is a diagram for the implementation of a method of agglomeration for the plant as in Tables 2 to 16.
Figure 2:
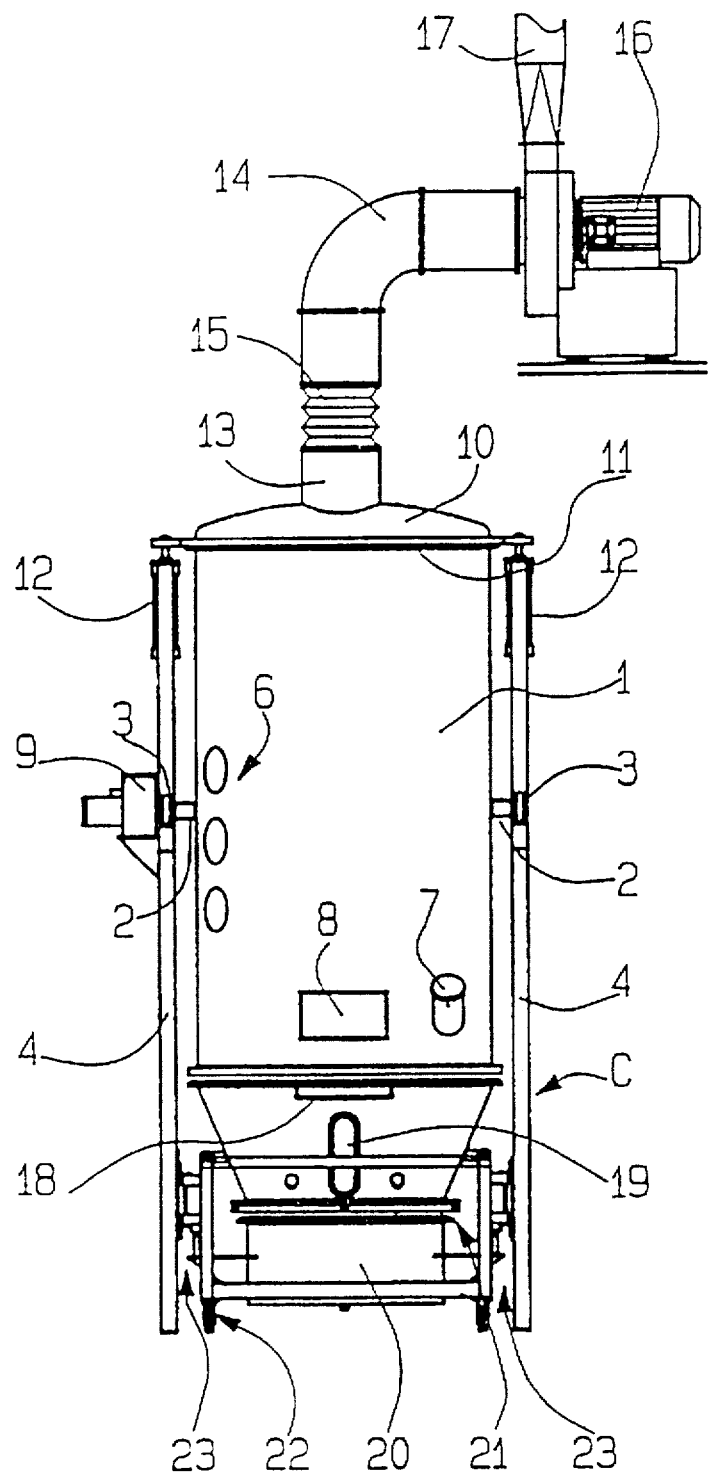
FIG. 2 is the front view of the agglomeration plant.
Figure 3:
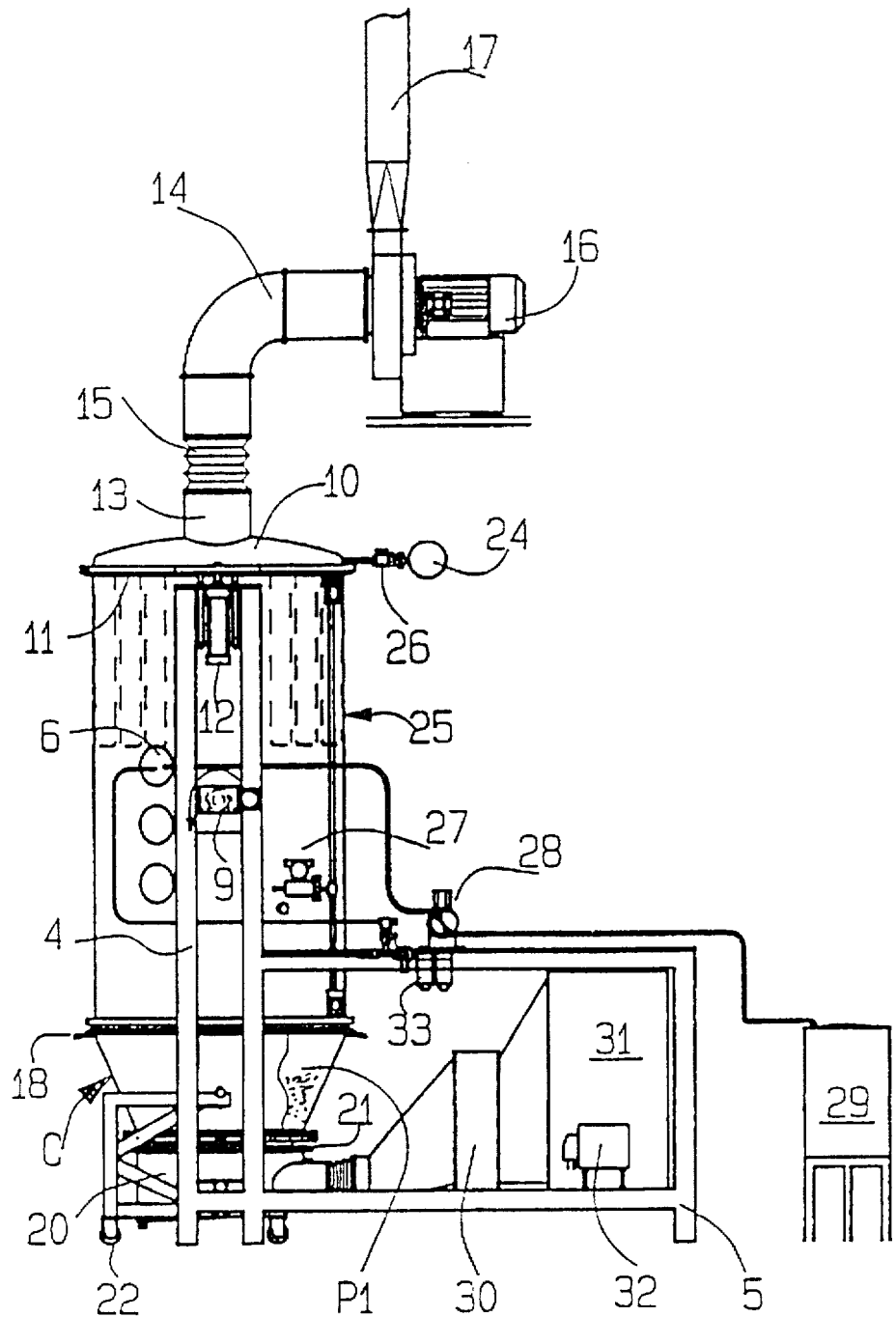
FIG. 3 is the side view of FIG. 2.
Figure 4:
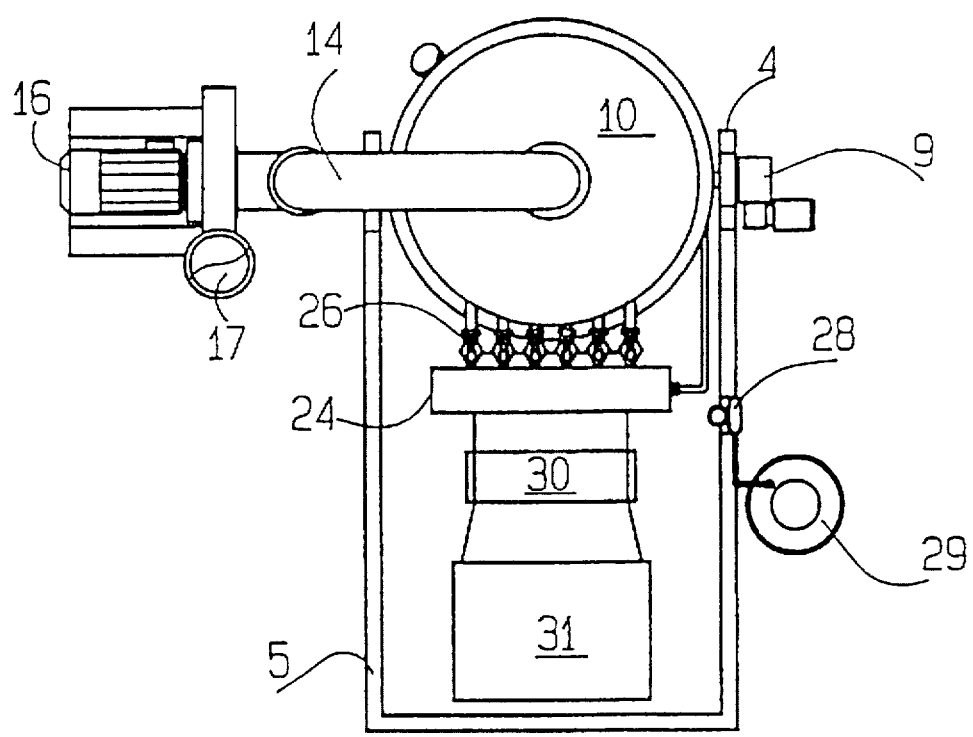
FIG. 4 is the plan view of the plant of FIG. 2.
Figure 5:
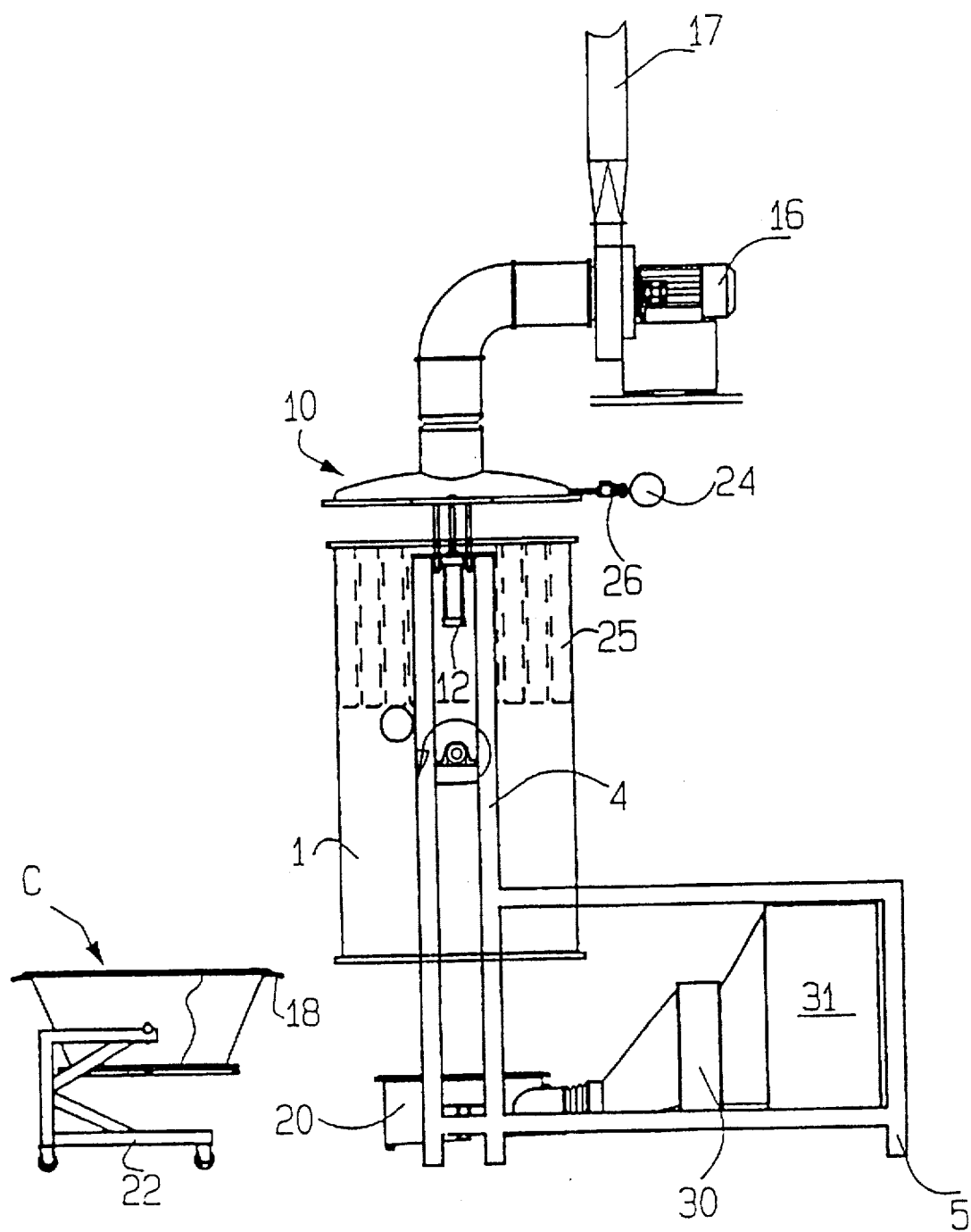
FIG. 5 is the side view of the plant of FIG. 2, but with the cover, or cap, raised for the substitution of the bag filters and with the trolley with basket displaced laterally.
Figure 6:
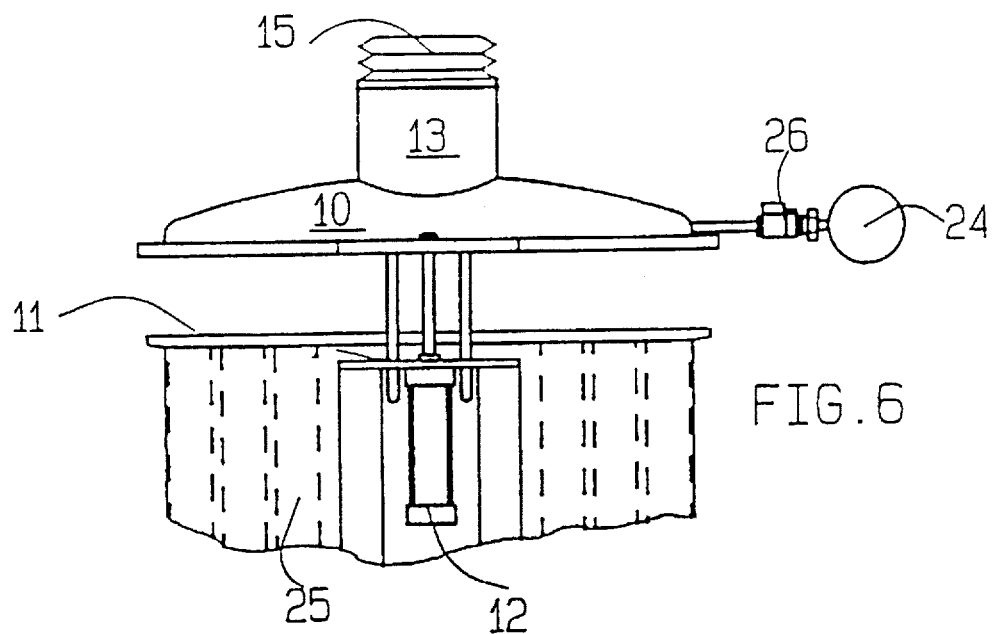
FIGS. 6, 7 illustrate the raising and lowering device for the cap.
Figure 7:
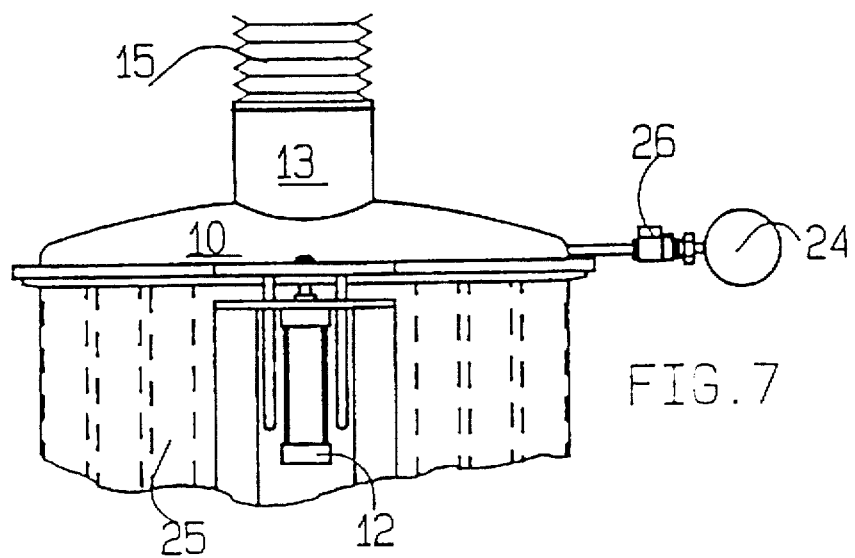
Figure 8:
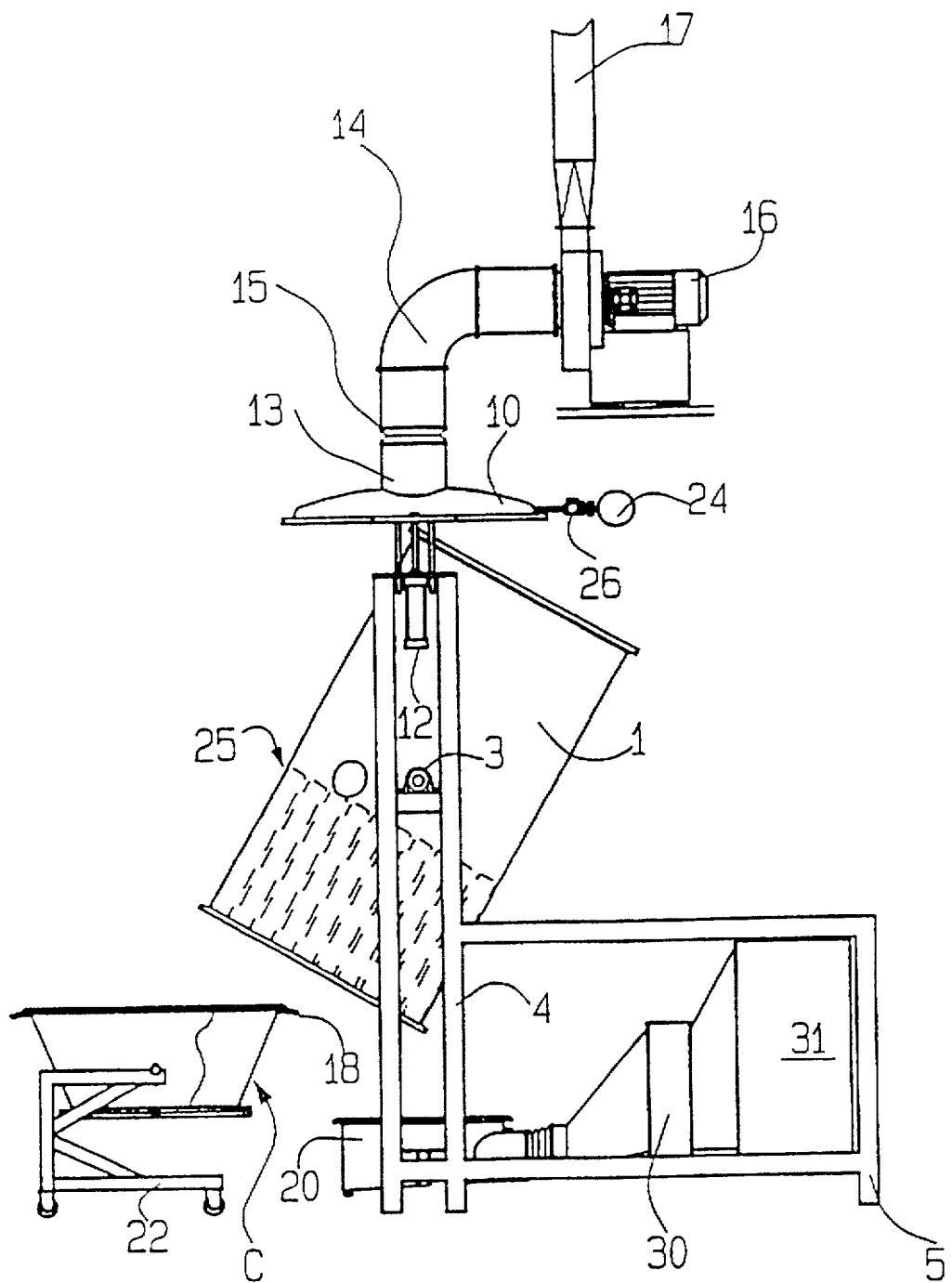
FIG. 8 is the side view of the plant with the container in an overturned position to extract the filters.
Figure 9:
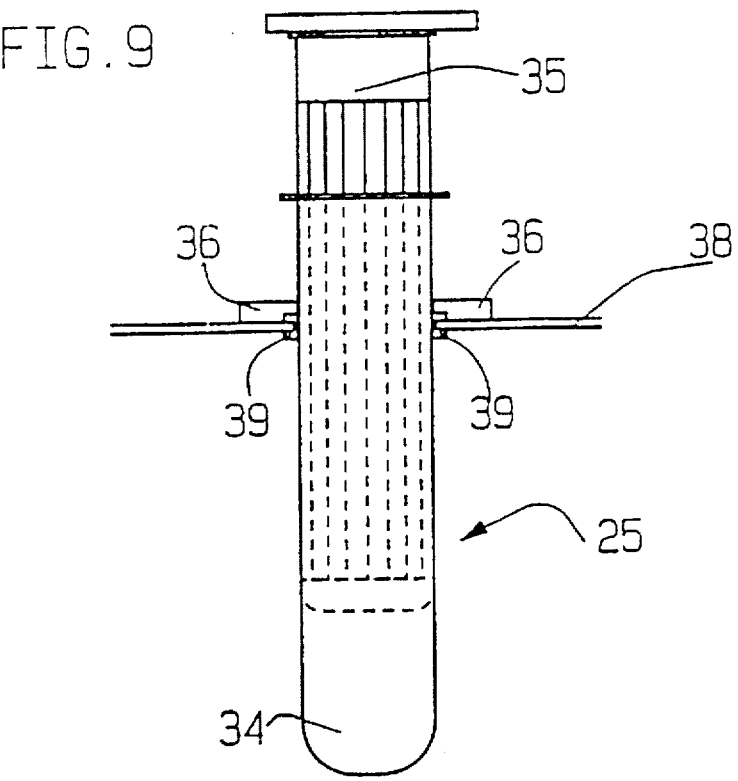
FIGS. 9, 10, 11 are, respectively, the side view of a bag filter with corresponding detachable basket and the plan views of the coupling device for the bag filter, respectively in the coupled and uncoupled positions.
Figures 10, 11:
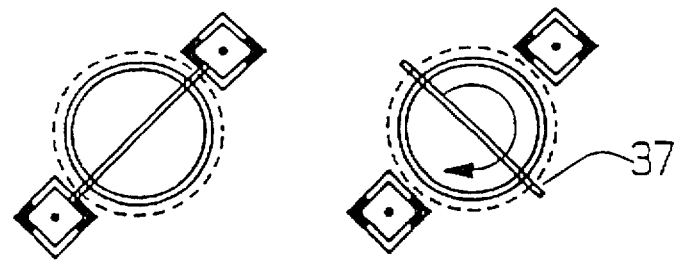
Figure 12:
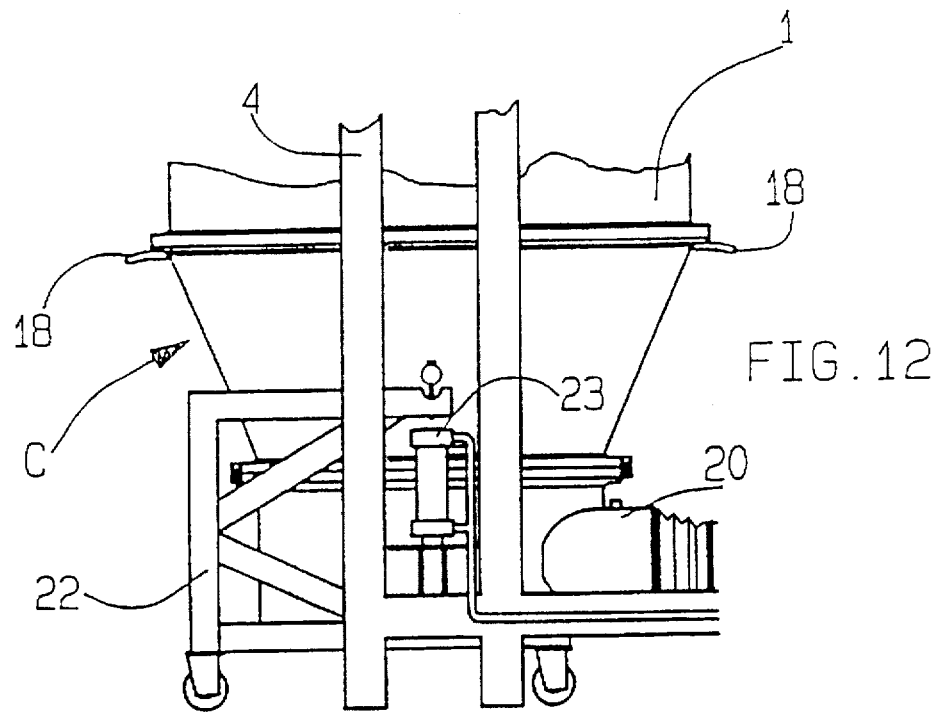
FIGS. 12, 13 illustrate the lifting device for the basket for the hermetic closure of the bottom end of the agglomeration chamber, respectively, in the raised and lowered positions.
Figure 13:
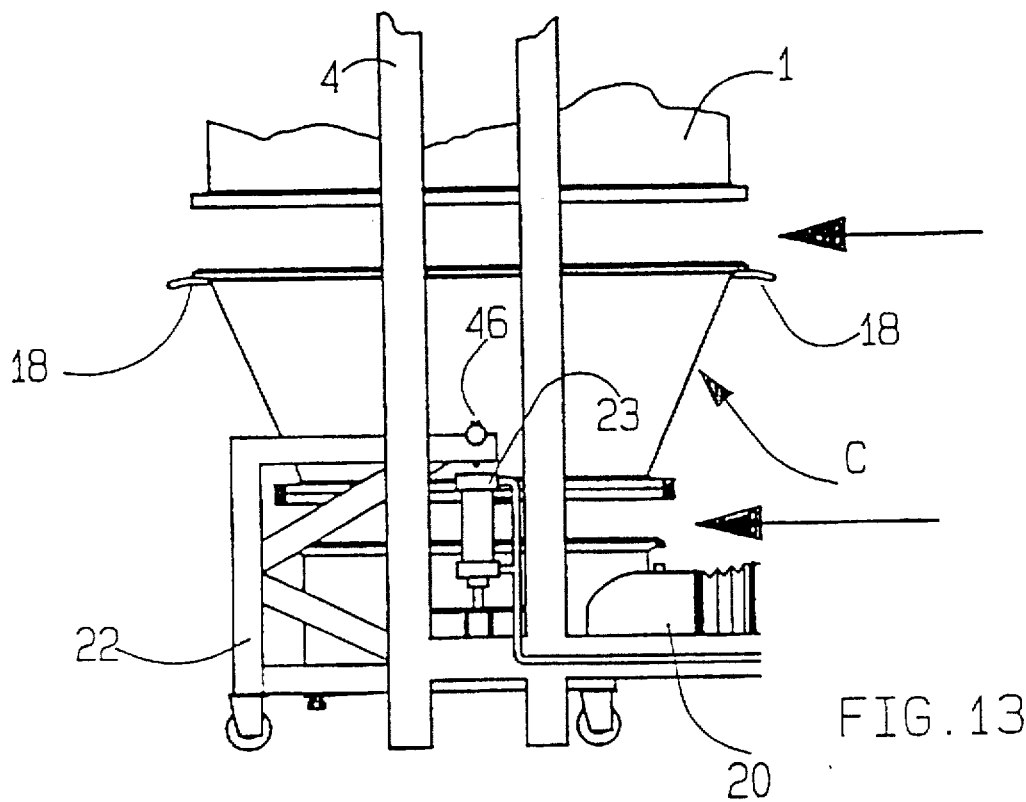
Figure 14:
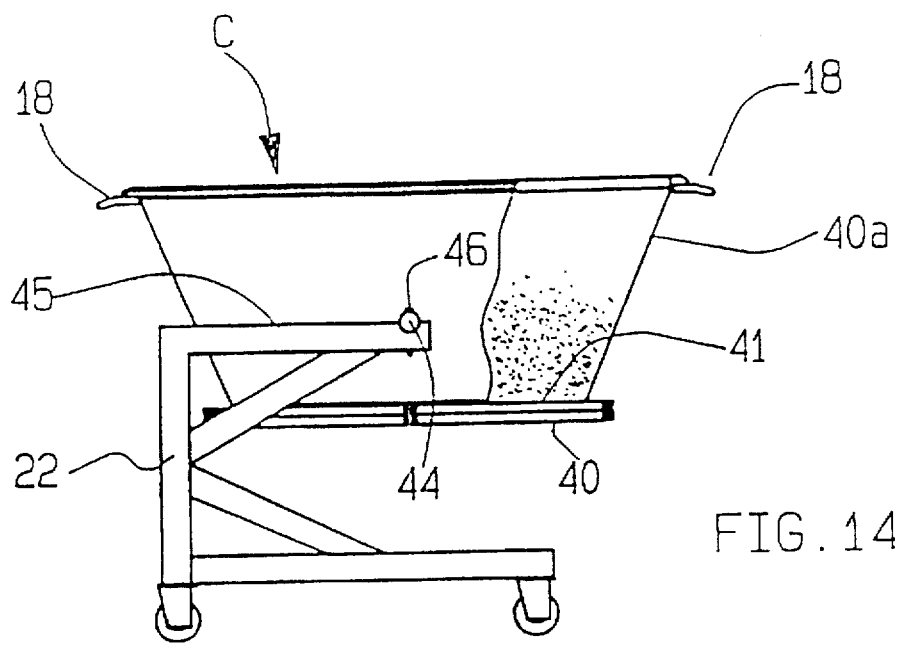
FIGS. 14, 15 illustrate the basket in the two positions, respectively, horizontal and rotated for emptying.
Figure 15:
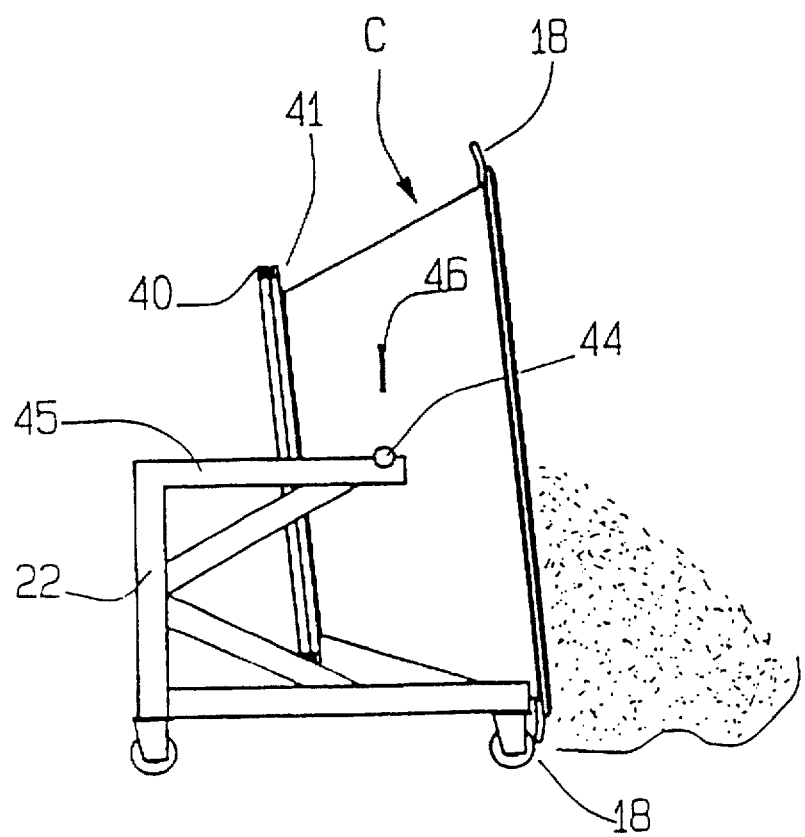
Figure 25:
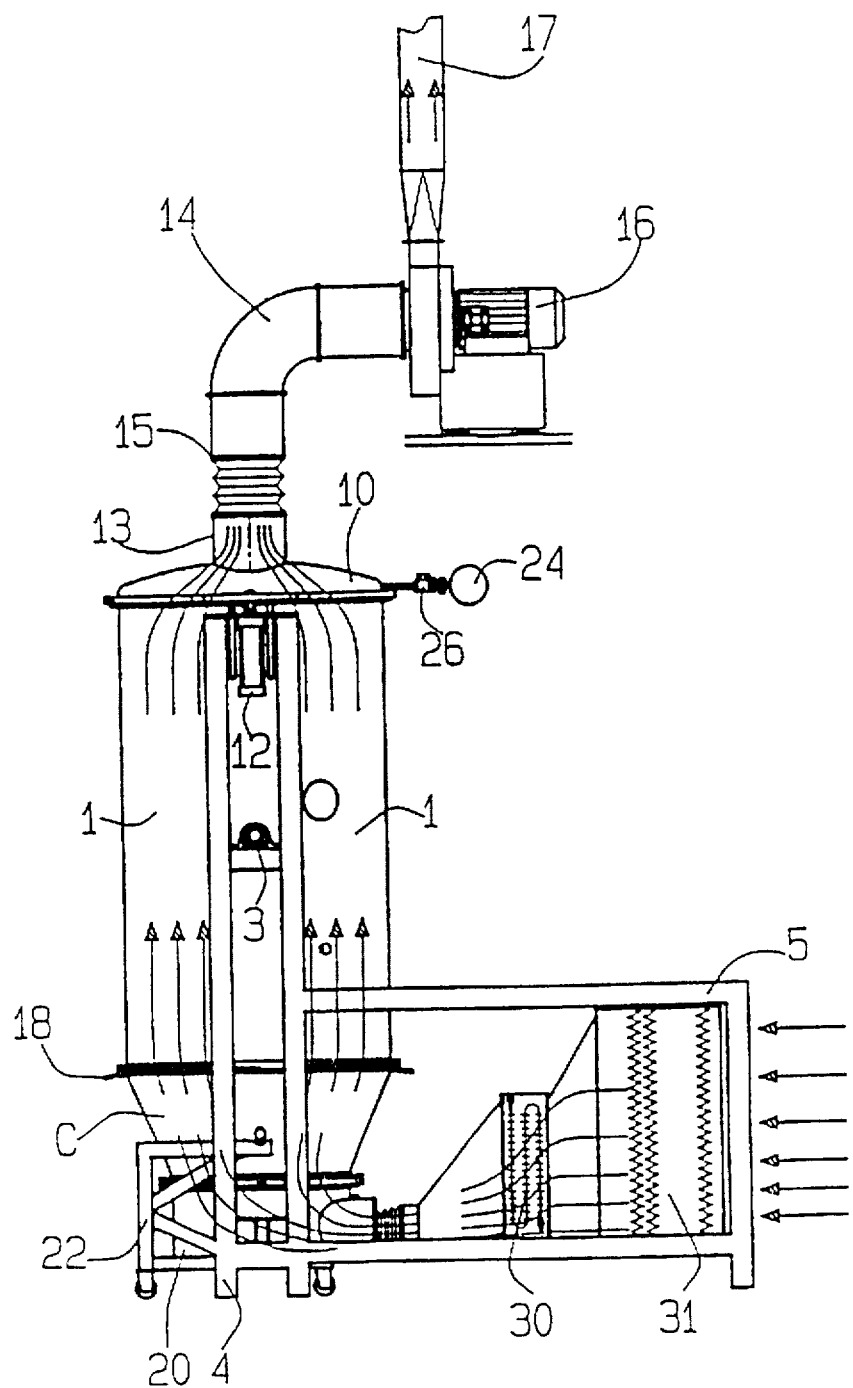
FIG. 25 is the side view of the empty plant, that is, without powder to be agglomerated, showing the flow lines of the air from inlet to outlet.
Figure 26:
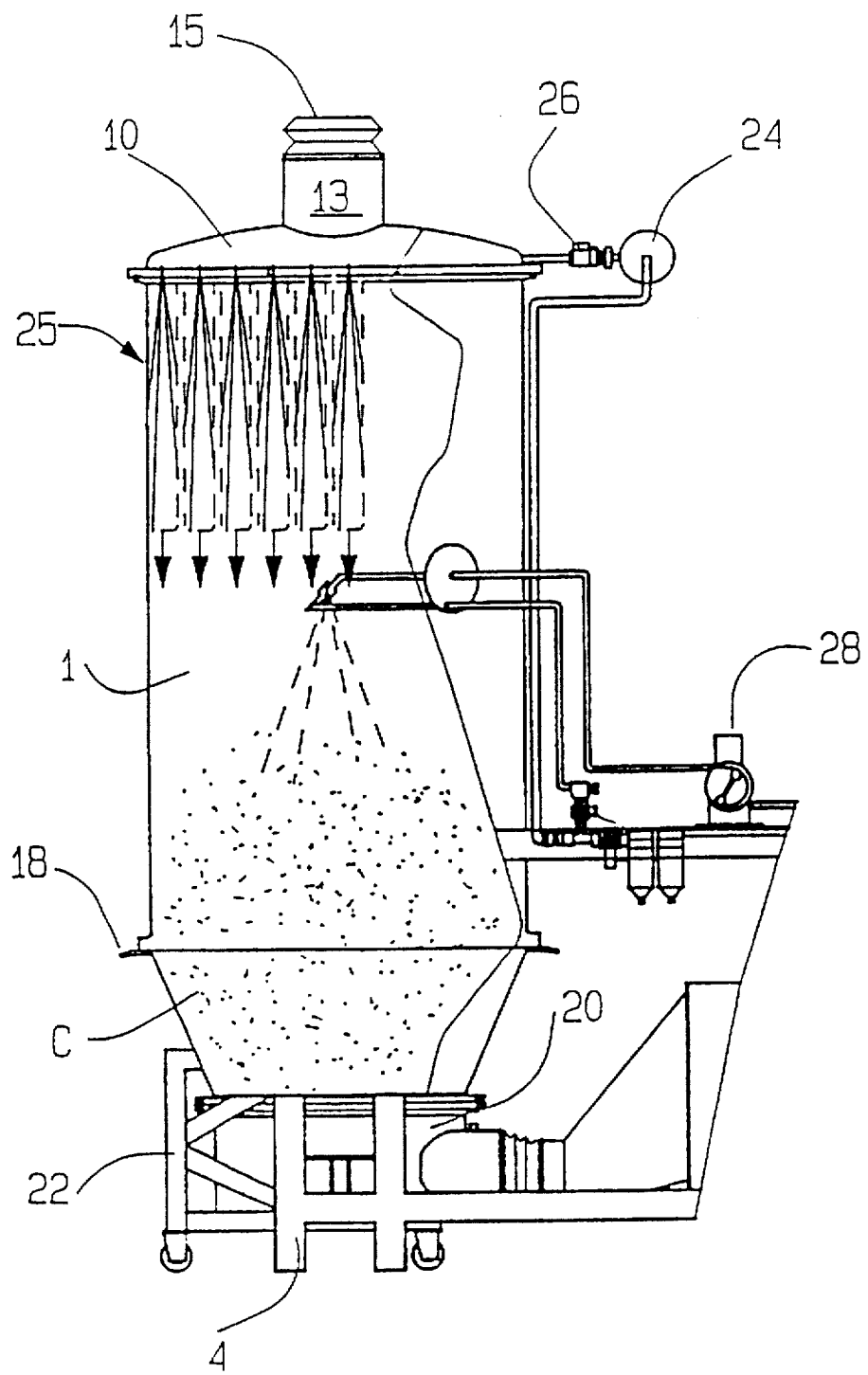
FIG. 26 is the simplified, interrupted and partially sectioned side view of the plant in operating conditions.
Figure 27:
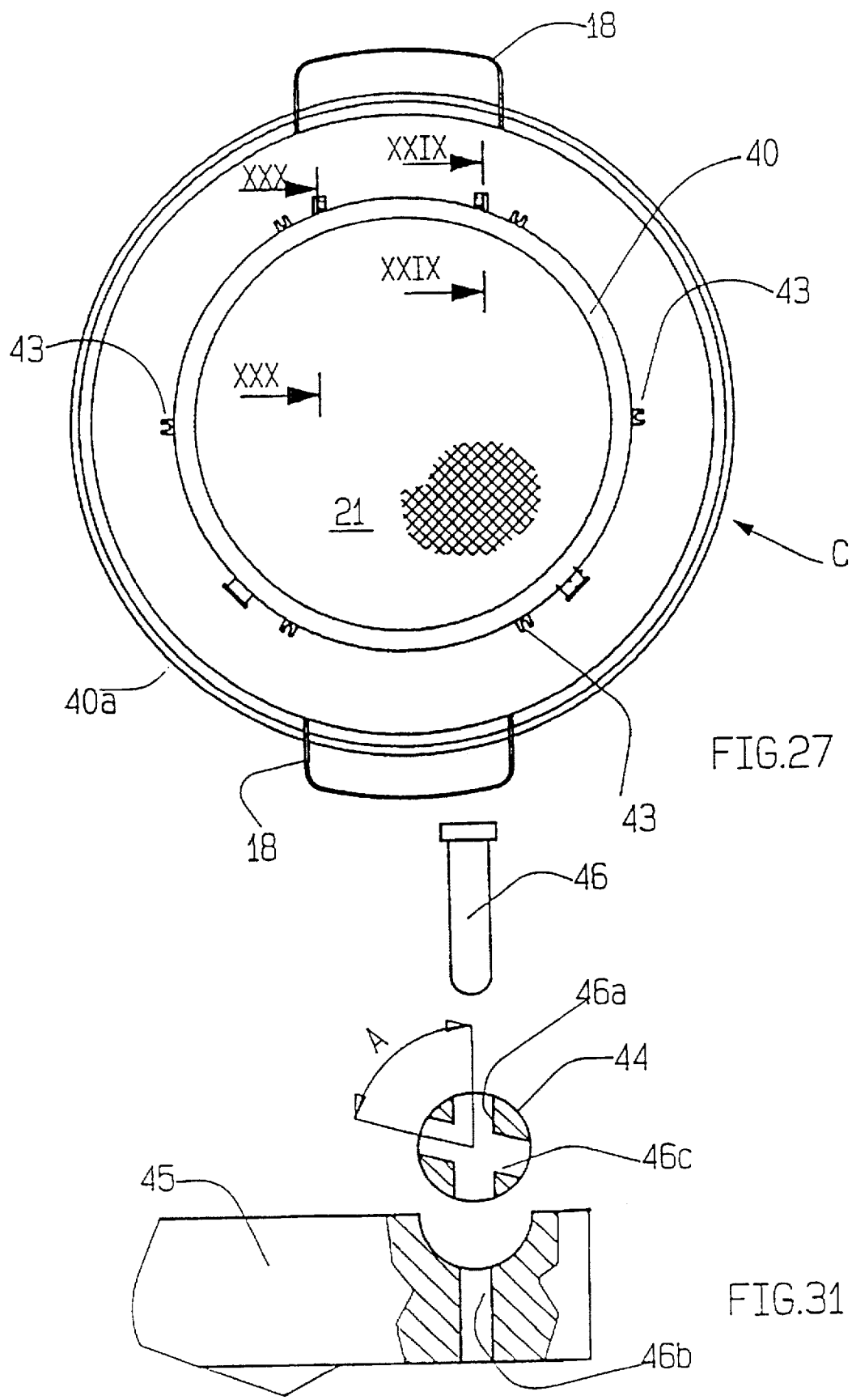
FIG. 27 is an enlarged plan view of the basket containing the powder in the configuration of FIG. 16, but in a version with a rapid action locking device for the fluidizing net.

The figures show: L, S, (FIG. 1) respectively, the binding liquid (for example, water and sugar) and the corresponding atomized phase by means of compressed air at pressures ranging from approximately 2 bar to approximately 7 bar; P1, C, respectively, the powder to be granulated (for example, high density whey proteins) placed in the corresponding container or basket; A1, F1, R, respectively, the outside air, the filtering station and the heating station; G, the agglomeration chamber into which flow, respectively, the powder to be agglomerated P1, outside air A1, filtered and heated, atomized binding liquid L; A2, the spent air, which, after having heated granulated product P2 in agglomeration chamber G, is filtered in F2 and reintroduced into atmosphere A2; 1, (FIG. 2) the intermediate tubular element, constituting the casing of the agglomeration chamber, having appendages 2, advantageously horizontal, cylindrical and positioned opposite each other, rotationally coupled to supports 3, for example, Y shaped, fixed to risers 4, of frame 5 (FIG. 3); 6, apertures in tubular element 1 to enable nozzles to be inserted in it for the injection of compressed air and binding liquid for the agglomeration of the powder; 7, an opening for loading the powder or for extracting samples; 8, an inspection hatch; 9, rotating means, preferably a motor reducer, for the rotation of element 1 around appendages 2; 10, a cover, or cap, fixed in a detachable manner to top flange 11 of element 1 by means of first lifting means, preferably pneumatic cylinders, 12 having guides to centre the cover on closure; 13, a tubular joint connecting cover 10 to extraction pipe 14 via flexible joint 15; 16, the motorized ventilating unit to create a vacuum, for example at ⅒ bar, in agglomeration chamber G, defined inside the tubular casing 1; 17, the exhaust pipe for spent air A3; 18, the handles of basket C, having inspection opening 19; 20, a manifold for heated air A1 to channel it towards agglomeration chamber G, through net 21 of basket C that fluidizes the product during agglomeration; 22, a trolley on which basket C is mounted, detachable at least in the vertical direction; 23, second lifting means, preferably actuation devices that lift manifold 20 of air A1 and basket C separating it from corresponding trolley 22 so as to hermetically seal the lower opening of casing 1, such devices consisting of, for example, pneumatic cylinders; 24, (FIG. 3) a compressed air reservoir for cleaning bag filters 25; 26, solenoid valves to, activate in sequence the cleaning cycle of bag filters 25; 27, a vacuum gauge inside chamber G; 28, a pump for the binding liquid, advantageously peristaltic, for the injection of liquid L in chamber G and, during the phase of inverted sense of rotation, to prevent liquid from dripping from the atomizing nozzle of the dispenser; 29, a reservoir for binding liquid L; 30, a heat exchanger to heat the air; 31, a filter element to filter outside air A1; 32, an electrical junction box; 33, auxiliary filter elements to filter the compressed air for the atomizing dispenser, for cleaning bag filters 25 and for the supply to the pneumatic cylinders; 34, (FIGS. 9, 10, 11) a bag filter to filter the air exiting granulation chamber G; 35, a cylindrical wire frame support inside the filter bag serving as stiffener; 36, a plastic positioning element to anchor the support, by means of upper diametric traverse 37 of support 35, to support. plate 38 that carries the bag filters 34: the extremities of traverse 37 being such as to cooperate with a pair of opposing grooves, not shown, of elements 36, so as to achieve a bayonet coupling; 39, air seals between bag 34 and corresponding insertion hole in plate 38.

Basket C consists of body 40a, preferably in the shape of a truncated cone, having, at its minor base, flange 41 to which is coupled in a detachable manner, for example, by means of eye bolts 43, external peripheral ring 42 supporting net 21: the eye bolts, or other analogous coupling devices, lock ring 42 of net 21 against flange 41, within corresponding annular seats present in said flange and in said locking ring, by means of detachable locking ring 40.

Locking ring 40 has a number of spokes 40b to limit the deformation of net 20 with the weight of the material contained in basket C.

The eye bolts, having a screw stem as shown in FIG. 19, can have one end having a hinged coupling with locking ring 40 in peripheral protruding supports 43a, the other end being insertable in corresponding U shaped appendages 43b protruding outwards from flange 41.

Basket C also has cylindrical appendages 44, protruding outwards, preferably with aligned horizontal axes, to support the basket on horizontal arms 45, parallel with one another, of trolley 22.

The part of the arms, preferably the ends, that couple with appendages 44 have seats 44a coupled with the external shape of appendages 44, so as to allow the rotation in the seats of the appendages: in the example illustrated in FIG. 21, seats 44a are semi-cylindrical.

At least one of the appendages 44 has a reference means for setting the angular position of basket C in relation to trolley 22: such reference means can advantageously comprise, simply and effectively, removable locating pin 46 inserted from above in vertical through hole 46a in each appendage 44 and in hole 46b aligned with in corresponding arm 45.

Figure 28:
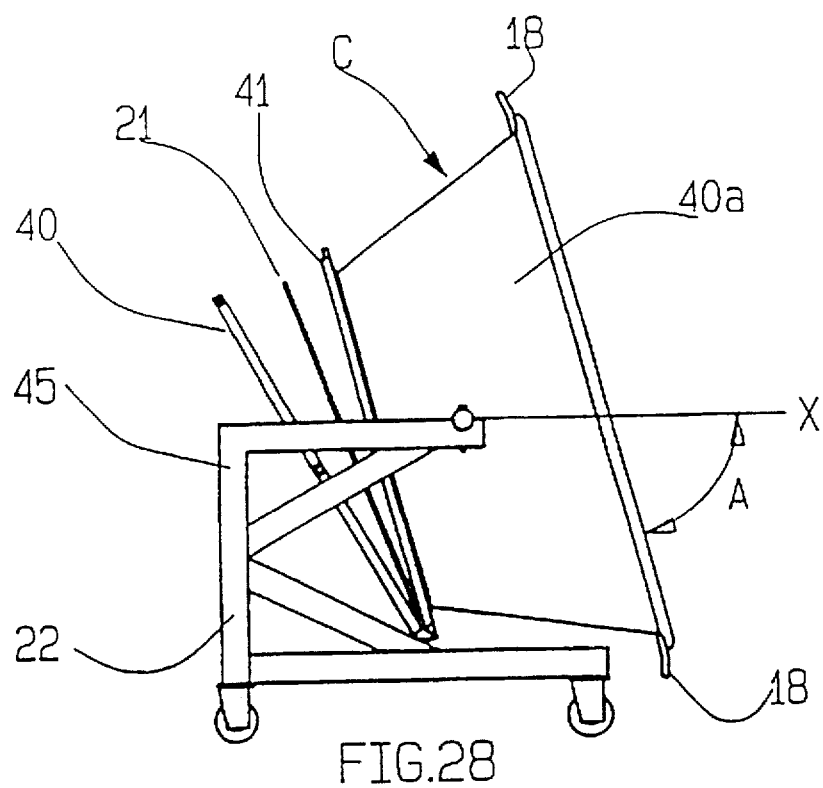
FIG. 28 is the side view of the basket in FIG. 27, in an inclined position for cleaning or inspecting the fluidizing net.
Figure 29:
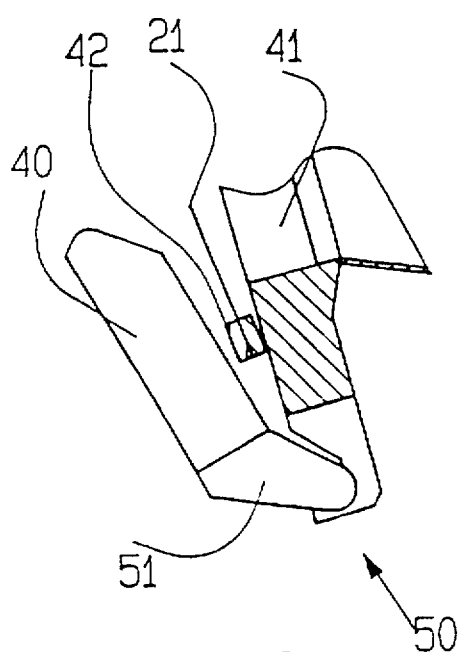
FIG. 29 is partial, enlarged and interrupted section XXIX—XXIX of FIG. 27.
Figure 30:
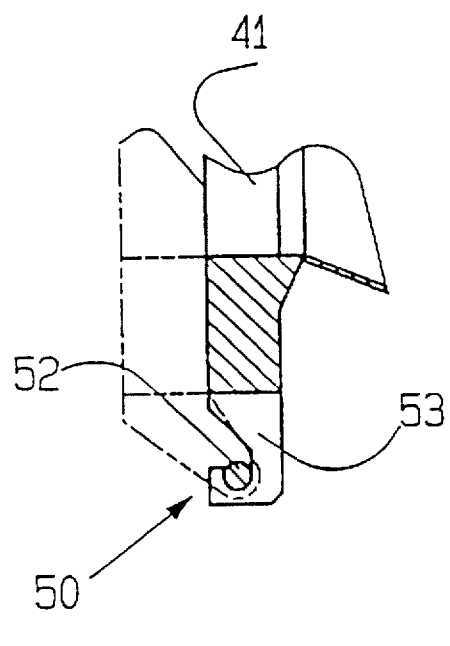
FIG. 30 is section XXX—XXX of FIG. 27.

In a further version, shown in FIG. 31, the means of reference comprise a number of through holes, shown as 46a, 46c, in appendage 44, having coinciding axes and forming between them angle A corresponding to the inclination of basket C when it is positioned with an inclination of approximately 90° to the horizontal for the substitution of the net, as illustrated in FIG. 28; holes 46a, 46b can be positioned in transverse planes that are parallel to each other in order to avoid excessive weakening of appendage 44.

In this last case hole 46b may consist of a slot with a length sufficient to enable the insertion of pin 46 in anyone of holes 46a, 46b.

It is to be noted that the locking ring can be hinged to flange 41 by means of a pair of hinges 50, positioned peripherally on the minor base of the truncated cone body 40a.

Each hinge 50 consists of a bracket 51 fixed peripherally to locking ring 40, having a central portion that couples with a hooked seat 53 correspondingly located on flange 41 of container C. With such an arrangement it is possible to rapidly remove locking ring 40 from flange 41.

Figure 34:
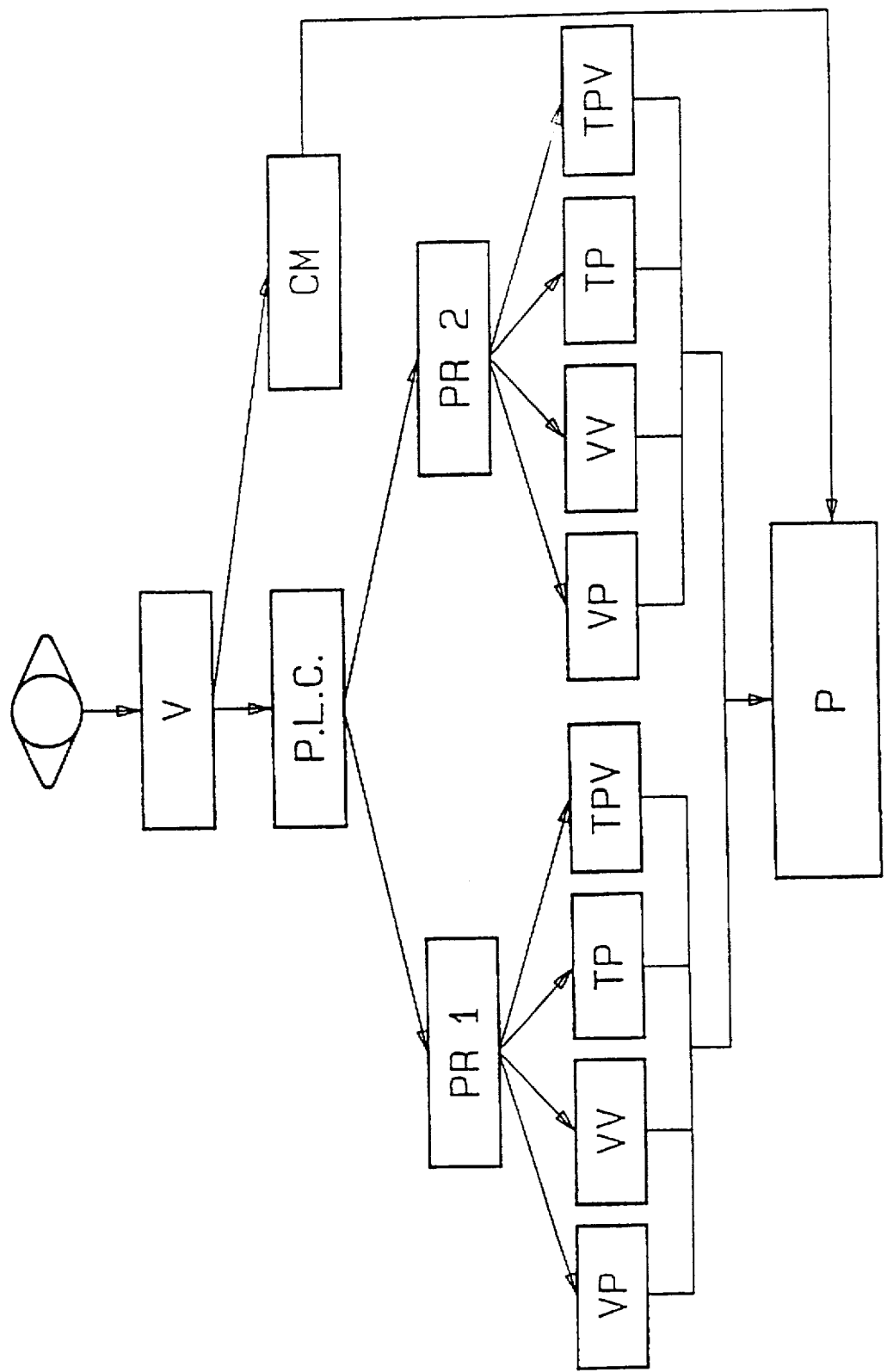
FIG. 34 is an operational diagram for a plant for agglomerating powders equipped with both programs of the diagrams in FIGS. 32 and 33.

The figures also show: 47, the positioning guides for trolley 22 with respect to risers 4; V, (FIG. 34) the parameters of the method to be set, in the case of the operational cycle controlled by means of an electronic computer; CM, the application of manual commands; P.L.C. (Programmable Logical Computer) a programmable processor; PR1, PR2 two automatic programs, differentiated by two possible different sequences of the same parameters depending on the type of process P; VP, the parameter for the speed of rotation of the pump; VV, the parameter for the speed of rotation of the ventilator; TP, the time interval reserved for cleaning bag filters 25; TPV, the time intervals of operation of pump 28 and ventilator 16; it is to be noted that with program PR2 the cleaning phase is continuous during the agglomeration process.

Operation is as follows: having filled basket C with the quantity of powder or granules that correspond to a load, air circulation is activated to set up a vacuum in agglomeration chamber G by activating motorized ventilator 16, thereby initiating fluidization, at first executed dry for a period sufficient to heat up the load; then the binding liquid is supplied to the atomizing dispensers by activating peristaltic pump 28 until the desired size of granule is obtained: a complete cycle possibly consisting of a number of iterations of the phases described above, executed with manual commands or automatically, for example, using programs PR1 or PR2.

The hermetic closure of agglomeration chamber G is achieved by activating cylinders 23 that lift air funnel 20 so that its upper ledge comes into contact with bottom flange 40 of basket C and, continuing upwards, lifting also the basket until its upper rim creates a sealing contact with the lower rim of casing 1 of agglomeration chamber G with perfect centering due to guides 47; lowering cylinders 23 disengages the casing of the chamber to enable the basket to be removed or in preparation for the overturning manoeuvre, after cap 10 has been lifted by activating cylinders 12.

It is to be noted that at the end of the lifting stroke of basket C, the lower extremity of each floating pin 46 mqy advantageously be still in a position to act as guide when lowering the basket at the end of the granulation cycle. This being achieved by determining a length for each pin that is sufficient to prevent it from being pulled out of hole 46b when basket C is in its uppermost position.

With the intermediate section of the casing of agglomeration chamber G separated it is possible to rotate it on a horizontal axis passing through supports 3, for example by means of a motor reducer, in order to overturn it.

The central portion of the casing of a silo for storing powdered, or granulate, materials (not shown) can be rotated in an entirely analogous manner, when it is coupled detachably to a closing cover, raised by means of actuators analogous to cylinders 12, and to a base structure for the extraction of the product, for example consisting of a screw conveyor, vertically coupled to the lower rim of the central portion by means of actuators analogous to cylinders 23.

The substitution of fluidizing net 21 is achieved after disengaging eye bolts 43 from their seats on the periphery of flange 41 so as to free external support ring 42 from the net; before this, each pin 46 has to be extracted from hinge pins 44 for the subsequent rotation of basket C on hinge pins 44 so as to position the net on the top side for convenient disassembly; pins 46 are then reinserted to hold the basket in position until the substitution of the net has been completed.

The following is a list of the parameters relating to the method.

T1, time interval for preheating the powder, or granules;

T2, time interval for dispensing the binding liquid, defining the duration of the agglomeration phase;

T2', possible time interval of inversion of the flow of binding liquid;

T3, time interval for drying the granules;

T4, time interval between two successive cleanings of the subgroups of filter elements;

T5, duration of each cleaning phase of a subgroup of the filter elements;

NCP, number of cleaning phases of the entire filter unit in a complete cycle;

VP, angular velocity of the supply pump for the binding liquid;

VIP, angular velocity of the supply pump for the binding liquid in the possible phase of inversion of flow of the liquid;

DP, pressure value (advantageously negative) in the agglomeration chamber;

NC, number of iterations of the phases that make up a complete cycle;

T, time interval for cleaning the entire filter unit.

The above parameters, that can vary widely depending on the type and state of the product, are set beforehand by the operator on the programmable processor PLC by means of keyboard TAS, or recalled from the memory of the PLC. Keyboard TAS and processor PLC can be positioned in different locations, even at a considerable distance from each other, to enable centralized control of a number of plants.

For the same reason, in the case of the keyboard being located on the plant, it is possible to interface processor PLC with a remote personal computer, even connected to a network.

The control of the air temperature, heated, for example, by means of a heat exchanger, can be made independent of processor PLC, or controlled by it, for example, by defining a further variable to be set using keyboard TAS, interpreted as a threshold value to be reached before commencing the agglomeration phase. The method is executed in the succession of phases as follows.

In the first phase F1 the body of powder, or granules, is preheated for a set time T1, depending on the initial type of product and on the dimensions of the granules, as specified indicatively in the examples given later.

In the second phase F2 the flow of binding liquid is activated for a time T2, corresponding to the formation of granules having the required dimensions, prior the possible phase F2' of inversion of flow in the outlet line of the dispenser to prevent it from dripping.

The third phase F3 then follows, in which the granules are dried for a set time T3, and subsequent repetitions for a number NC of iterations of all the phases F1, F2, F2', F3 or even just some of them, depending on the set sequence.

Figure 32:
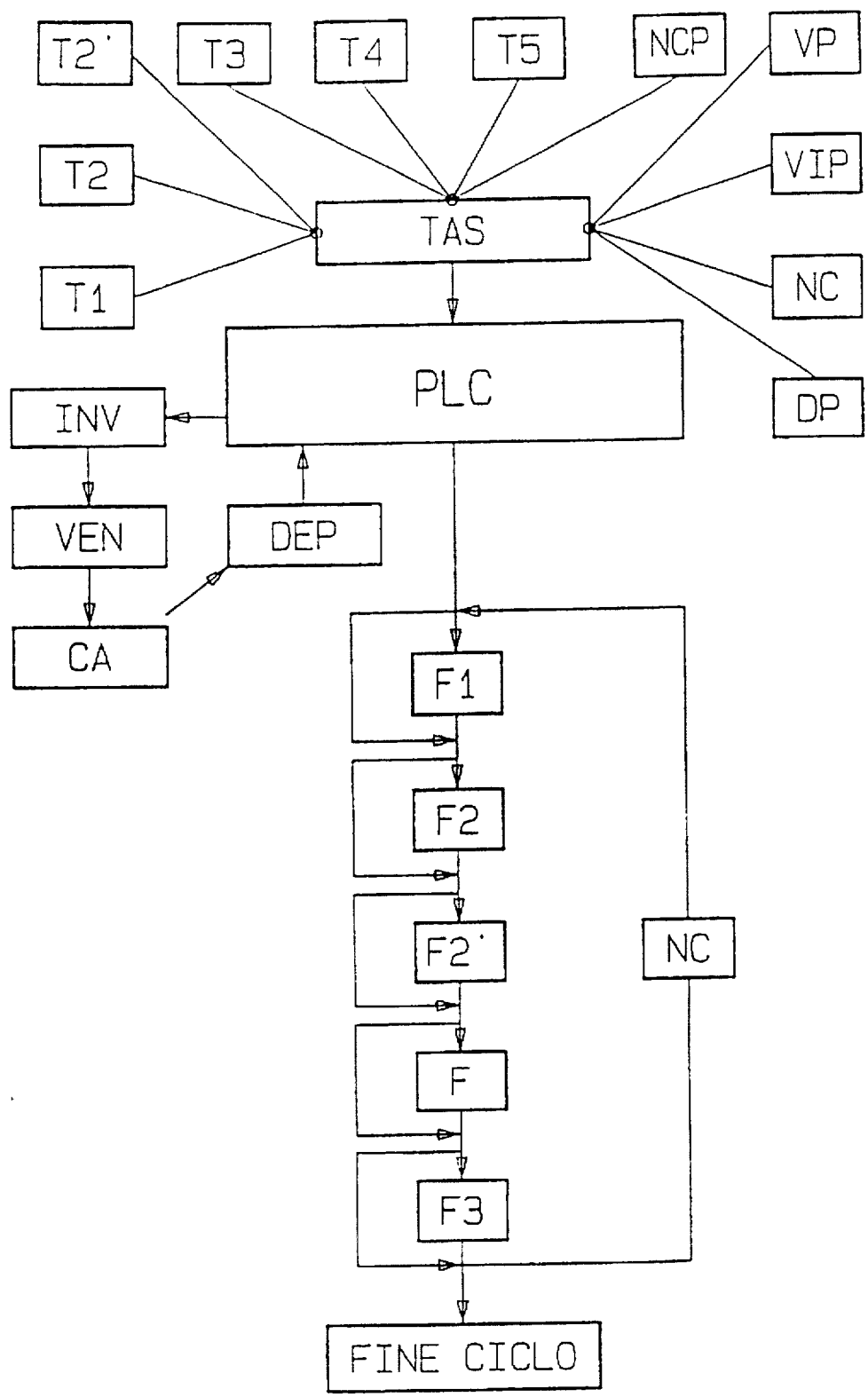
FIG. 32 is a block diagram of a computer program to implement the method as described in the present invention, in the version with the cleaning phase of the filter units in series.

In the program of FIG. 32, after the possible phase F2', there is a cleaning phase F for the filter unit, extending for a time T definable as the sum of the product of T5 with the number n of subgroups in the filter unit and the product of T4 with the number subgroups of filters, less one unit.

$$T = n\ T5 + (n-1)\ T4$$

Figure 33:
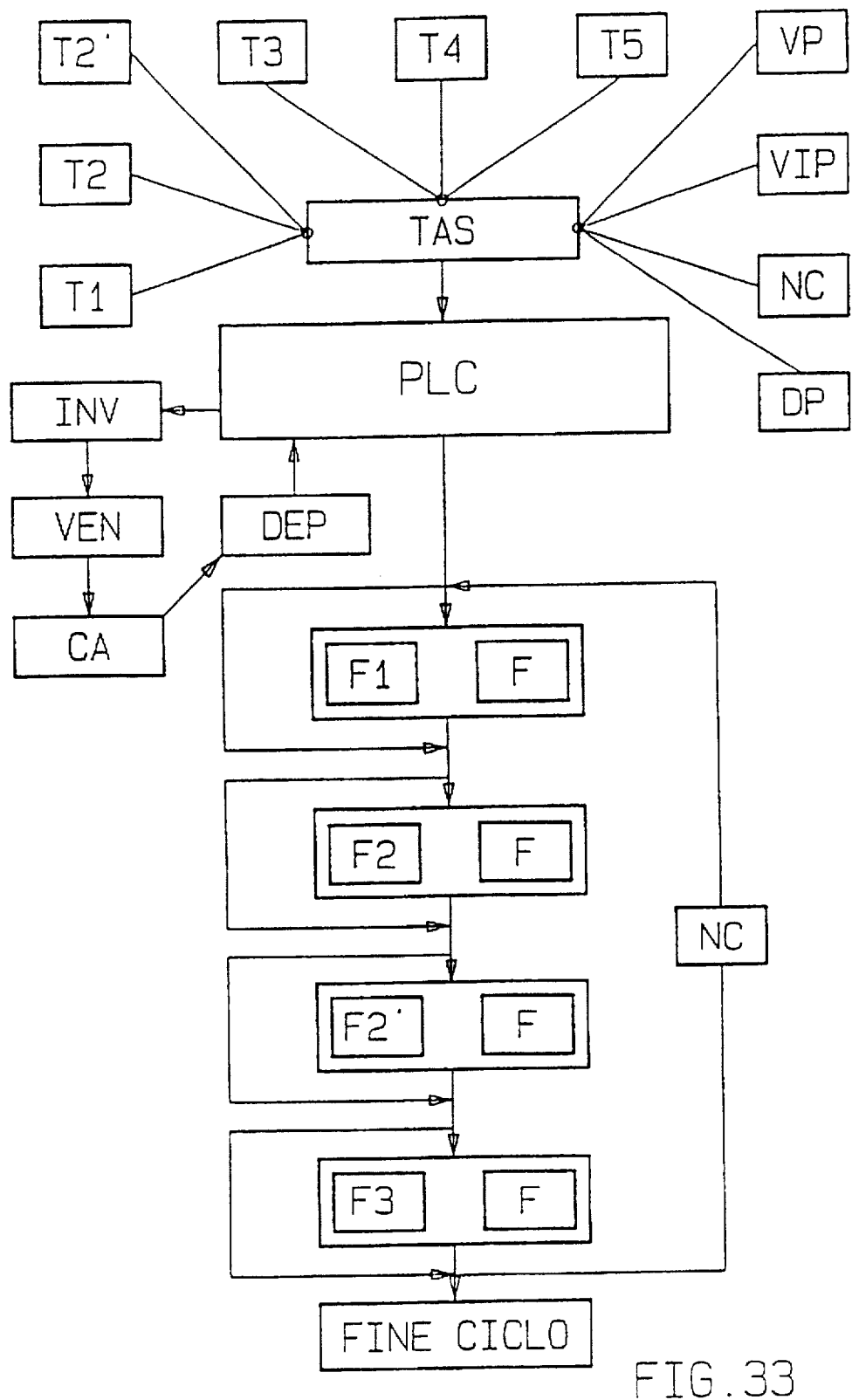
FIG. 33 is a block diagram analogous to that of FIG. 32, but with the cleaning phase of the filter units in parallel.

In the case of the program as per diagram in FIG. 33 phase F extends for the entire duration of the sequence, even partial, of phases F1, F2, F2', F3. It is to be noted that, in this case, cleaning of the subgroups of the filter unit is carried out with a cyclic sequence distributed throughout the extent of each phase, without interruptions.

In both cases, the cleaning of the filter unit being advantageously carried out by reverse compressed air cleaning.

At the same time as the above phases are being executed, processor PLC governs a retroactive control sequence of the vacuum in agglomeration chamber CA.

A signal proportional to the value of the vacuum measured in chamber CA is sent to PLC and compared with the set variable DP; in the case processor PLC determines that the vacuum greater than the set limit DP, it activates a frequency converter INV to slow down the aspiration unit VEN, thereby reducing the vacuum in chamber CA; in the case of insufficient vacuum, PLC commands an acceleration of the aspiration unit.

Instead of activating ventilator VEN, converter INV can activate a servomotor to vary the aspiration flow section upstream of chamber CA.

The activation of the servomotor can also be directly controlled by processor PLC.

In this last case, however, it is to be noted that the benefits resulting from the reduction in losses no longer obtained, whereas they are with the control of the speed of rotation of ventilator VEN.

Ventilator VEN is advantageously located downstream of the agglomeration chamber, so as to be able to achieve the desired vacuum in the agglomeration chamber; moreover, it can also be located upstream of the said chamber, however presenting greater difficulties in the control of the process and of the flow of air.

EXAMPLE 1

Product: single load of high fluidity dehydrated whey proteins (for human or animal alimentary preparations)
Specific gravity: 0.65 kg/dm$^3$
Granulometry: greater or equal to 60 micrometers
Quantity treated: 67 kg
Binding liquid: sugar solution in water with 30% sugar
Program as per FIG. 33
Agglomeration chamber inlet air temperature during the first heating phase of the powder: 100° C.
Granulation chamber inlet air temperature during the second phase of agglomeration and the third phase of granulate drying: 80° C.
Parameter setting:
T1=30 min
T2=16 min
T2'=5 s
VP=10 rpm (flow =26 l/h)
VIP=80 rpm
T3=10min
T4=1 s
T5=2 s
DEP=150 mmH$_2$O (1470 Pa)
NC=1
Duration of complete cycle: 56 min
Characteristics of the granulate:
  quantity obtained: 55 kg
  granulometry: 400 micrometers
  losses: 12 kg
  efficiency: 82%

EXAMPLE 2

Product: single load of powdered maize starch (for alimentary or pharmaceutical preparations)
Specific gravity: 0.45 kg/dm$^3$ Granulometry: approximately 20 micrometers Quantity treated: 180 kg
Binding liquid: 3% malto-dextrin and dextrose solution in water
Program as per FIG. 33
Agglomeration chamber inlet air temperature during the first heating phase of the powder: 90° C.
Granulation chamber inlet air temperature during the second phase of agglomeration and the third pbase of granulate drying: 90° C.
Parameter setting:
T1=30 min
T2=40 min
T2'=5 s
VP=30 rpm (flow=75 l/h)
VIP=80 rpm
T3=20 min
T4=1 s
T5=2 s
DEP=300 mmH$_2$O (2940 Pa)
Duration of complete cycle: 90 min
Characteristics of the granulate:
  quantity obtained: 171 kg
  granulometry: greater or equal to 400 micrometers
  losses: 9 kg
  efficiency 95%

In both the above examples, the atomization of the binding liquid was obtained with an atomizing nozzle supplied with compressed air at a pressure of 5 bar to obtain liquid particles with an average diameter of 0.1–0.2 mm.

Furthermore, the supply of binding liquid was achieved by means of a peristaltic pump; however, other types of volumetric pumps can be employed, if it is not necessary to avoid contact between the liquid and the components of the pump, for example, for reasons of hygiene.

It is to be noted a great advantage of the present invention is the possibility of setting agglomeration phases of extended duration (in the examples up to 40 min); this is due to the possibility of executing cleaning phases in backpressure of subgroups of the filter unit with a cyclic sequence, even during the execution of the agglomeration phase.

In a further variation of the method of the present invention, the agglomeration cycle of the powder is controlled in function of the air temperatures at the inlet and at the outlet of the granulation chamber as follows:

the air temperature at the inlet of the chamber is set (set point temperature);

a critical air temperature at the outlet of the camber is also set, depending on the type of granulate (obtainable by experiment), as well as an air outlet temperature corresponding to the beginning of the atomization of the of the binding liquid (pump start temperature).

During the preheating phase of the powder, the outlet temperature tends to rise progressively until it reaches the pump start temperature, when the PLC triggers the start of the supply of binding liquid. This causes the progressive cooling of the powder being granulated, with consequent reduction in the air temperature at the outlet of the chamber, until the critical temperature is reached.

In a variation of the method, the supply of liquid is interrupted at this point to permit the powder to be heated and dried.

In a further variation the supply of the liquid is not interrupted, but the air inlet temperature is increased by an amount corresponding to the difference between the pump start temperature and the air outlet temperature measured after a set time interval.

EXAMPLE 3

In an example in which the powder to be granulated consists a tea extract, with an initial granulometry of approximately 50 micron, the critical temperature is approximately 55° C., the pump start temperature is approximately 60° C. and the initial Set point temperature is 95° C.

EXAMPLE 4

In a further example in which the powder to be granulated consists of a hypocaloric sweetener, with an initial granulometry of approximately 40 micron, the critical temperature is approximately 50° C., the pump start temperature is approximately 55° C. and the initial set point temperature is 95° C.

EXAMPLE 5

In a further example in which the powder to be granulated consists of a liquorice and starch based preparation, the critical temperature is approximately 37° C., the pump start temperature is approximately 40° C., and the initial set point temperature is 80° C.

In Example 3 the binding liquid consists of a sugar and caramel solution in water, whereas in Example 4 and 5 the binding liquid consists of malto-dextrin solution in water.

The agglomeration cycle finishes when the pump for the injection of the binding liquid is stopped after a set quantity of liquid has been dispensed.

At the end of the drying phase cleaning of the plant by means of cold air is provided, in order to cool the granulate and the plant.

In practice, the materials, dimensions and details of execution may be different from but technically equivalent to those described without departing from the scope of the claims.

We claim:

1. A plant for the treatment of powders, or granules, in the food, chemical or pharmaceutical industries, comprising a tubular casing coupled at its lower end to a base structure and at its top end to a closing cover (10) of an air filter unit, the tubular casing (1) being detachable from the base structure (C) and the cover (10) so that it can be rotated around a horizontal axis.

2. A plant, as claimed in claim 1, wherein the tubular casing (1) is provided with lateral appendages (2) that form a rotational coupling in supports (3) fixed to risers (4) of a frame (5) extending between the base structure and the cover.

3. A plant, as claimed in claim 2, wherein first lifting means (12) are fixed to said risers (4) for the controlled lifting of the cover (10) with an exhaust tube (13) coupled thereto, the exhaust tube of the filtered air having a flexible coupling (15).

4. A plant, as claimed in claim 3, wherein rotating means (9) are attached to the risers (4) to rotate the tubular element.

5. A plant, as claimed in claim 3 including second lifting means (23) to lift the base structure (C).

6. A plant, as claimed in claim 1, wherein said base structure comprises a basket container (C) that can be coupled, in a guided vertically floating connection, to the lower end of the tubular element (1).

7. A plant, as claimed in claim 6, wherein said basket container has on its sides a pair of appendages (44) that fit in a detachable manner in seats (44a) of the arms (45) of a trolley (22).

8. A plant, as claimed in claim 7, wherein at least one of the said appendages (44) cooperates with reference means for setting the angular position of basket (C).

9. A plant, as claimed in claim 8, wherein said reference means comprises at least one pin (46) that can be inserted into at least one hole in the appendage (44) aligned with at least one hole (46a, 46c) in the arm (45).

10. A plant, as claimed in claim 9, wherein the pin (46) has a length which is greater than the sum of the diameter of the lateral appendage (44) incremented by the lifting distance of the basket (C).

11. A plant, as claimed in claim 1 wherein the bottom of the basket (C) has a flange (41) to fix an external support ring (42) for a net (21) by means of a locking ring (40).

12. A plant, as claimed in claim 11, wherein said locking ring (40) is coupled to said flange (41) by hinge means (50).

13. A plant, as claimed in claim 11 wherein the locking ring (40) is coupled to the flange (41) by means of revolving stay bolts (43).

14. A plant, as claimed in claim 7, wherein said trolley (22) has arms (45) which may be inserted in guides (47) to centre the basket (C) close to the lower edge of the tubular casing (1).

15. A plant, as claimed in claim 11, wherein the hinge means (50) provide for detachable locking of the locking ring (40) to the flange (41) by means of brackets (51) inserted in hook slots (53) of the flange.

16. A plant, as claimed in claim 1, wherein said tubular casing (1) includes spraying means for spraying a binding liquid, said spraying means comprising inverting means for inverting the direction of flow of said binding liquid.

17. A plant, as claimed in claim 1, wherein said tubular casing (1) includes spraying means for spraying a binding liquid, said spraying means comprising diverting means for diverting the flow of said binding liquid upstream of an outlet of said flow.

18. A plant, as claimed in claim 1, wherein said tubular casing (1) is connected to an exhaust pipe (17) by means of a motorized ventilating unit (16) suitable for creating a vacuum inside the tubular casing (1).

19. A plant, as claimed in claim 1, wherein control means are provided for controlling the angular velocity of the ventilating unit (16).

* * * * *